United States Patent
Fels et al.

(10) Patent No.: US 11,859,603 B2
(45) Date of Patent: Jan. 2, 2024

(54) 3D-PRINTED OIL SEPARATION FOR RECIPROCATING COMPRESSORS

(71) Applicant: Copeland Industrial LP, Cudahy, WI (US)

(72) Inventors: Steven Fels, West Allis, WI (US); Steven Cihlar, Cudahy, WI (US); Pruthviraj Nagnath Pawar, Maharashrta (IN); Jean-Louis Picouet, Waukesha, WI (US)

(73) Assignee: Copeland Industrial LP, Cudahy, WI (US)

( * ) Notice: Subject to any disclaimer, the term of this patent is extended or adjusted under 35 U.S.C. 154(b) by 186 days.

(21) Appl. No.: 17/471,913

(22) Filed: Sep. 10, 2021

(65) Prior Publication Data

US 2021/0404456 A1    Dec. 30, 2021

Related U.S. Application Data

(60) Division of application No. 16/591,043, filed on Oct. 2, 2019, now abandoned, which is a continuation of
(Continued)

(51) Int. Cl.
*F04B 39/02* (2006.01)
*B23P 15/00* (2006.01)
(Continued)

(52) U.S. Cl.
CPC ............ *F04B 27/109* (2013.01); *B23P 15/00* (2013.01); *F04B 39/02* (2013.01); *F04B 39/04* (2013.01); *F25B 43/02* (2013.01); *B33Y 80/00* (2014.12)

(58) Field of Classification Search
CPC ........ F04B 27/109; F04B 39/02; F04B 39/04; F04B 39/0284; F04B 39/121;
(Continued)

(56) References Cited

U.S. PATENT DOCUMENTS

| 1,364,246 A | 1/1921 | Carrey |
| 1,500,361 A | 7/1924 | Brockway |

(Continued)

FOREIGN PATENT DOCUMENTS

| DE | 10221396 | 12/2003 | |
| DE | 10221396 A1 * | 12/2003 | ........... B60H 1/3223 |

(Continued)

OTHER PUBLICATIONS

Office Action from the Intellectual Property Office of India for Application No. 201844042734 dated Jun. 8, 2020 (6 pages).
(Continued)

*Primary Examiner* — Lawrence Averick
(74) *Attorney, Agent, or Firm* — Amundsen Davis, LLC

(57) ABSTRACT

A 3D-printed oil separation assembly for use in a reciprocating compressor is provided. The compressor includes a suction chamber, a crankcase chamber, and at least one partition member at least partially separating the suction chamber and the crankcase chamber. The at least one partition member further includes at least one opening. The 3D-printed oil separation assembly comprises a coalescing structure positioned within the crankcase chamber adjacent the at least one partition member at the at least one opening; and at least one securing structure secured in operable relation with the at least one demisting structure so as to secure the coalescing structure relative to the opening. The coalescing structure comprises at least one structure selected from the group consisting of a baffled structure, a demisting structure, and combinations thereof. At least a portion of the coalescing structure is 3D-printed.

8 Claims, 2 Drawing Sheets

Related U.S. Application Data application No. PCT/US2018/060949, filed on Nov. 14, 2018.

(60) Provisional application No. 62/740,200, filed on Oct. 2, 2018.

(51) Int. Cl.
*F04B 27/10* (2006.01)
*F25B 43/02* (2006.01)
*F04B 39/04* (2006.01)
*B33Y 80/00* (2015.01)

(58) Field of Classification Search
CPC ...... F04B 39/123; F04B 39/128; B23P 15/00; F25B 43/02; B33Y 80/00
See application file for complete search history.

(56) References Cited

U.S. PATENT DOCUMENTS

| | | | |
|---|---|---|---|
| 2,074,323 A | 3/1937 | Borgerd | |
| 2,844,305 A | 7/1958 | Becht et al. | |
| 3,016,184 A | 1/1962 | Hart | |
| 3,684,412 A | 8/1972 | Harlin et al. | |
| 4,280,799 A | 7/1981 | Struve et al. | |
| 4,741,177 A | 5/1988 | Glanvall | |
| 4,799,869 A | 1/1989 | Cordiano et al. | |
| 4,887,514 A | 12/1989 | Schintgen | |
| 5,090,873 A | 2/1992 | Fain | |
| 5,246,357 A | 9/1993 | Sjoholm et al. | |
| 5,417,184 A | 5/1995 | McDowell | |
| 5,733,107 A | 3/1998 | Ikeda et al. | |
| 6,082,981 A | 7/2000 | Nakajima et al. | |
| 6,206,653 B1 | 3/2001 | Dewhirst et al. | |
| 6,237,362 B1 | 5/2001 | Jang et al. | |
| 6,494,930 B2 | 12/2002 | Strikis et al. | |
| 6,736,623 B2 | 5/2004 | Li et al. | |
| 6,872,065 B1 | 3/2005 | Shimada et al. | |
| 7,018,184 B2 | 3/2006 | Skinner et al. | |
| 7,060,122 B2 | 6/2006 | Bhatia et al. | |
| 7,082,785 B2 | 8/2006 | Nieter et al. | |
| 7,165,541 B2 | 1/2007 | Hommes | |
| 8,597,005 B2 | 12/2013 | Nomura et al. | |
| 8,936,660 B2 | 1/2015 | Cruz et al. | |
| 9,581,061 B2 | 2/2017 | Kurita et al. | |
| 9,744,476 B2 | 8/2017 | Wardle | |
| 10,221,694 B2* | 3/2019 | Snyder | F01D 9/02 |
| 10,508,976 B1* | 12/2019 | Kirchnavy | G01N 21/59 |
| 10,982,672 B2* | 4/2021 | Scancarello | B22F 10/28 |
| 2001/0029727 A1 | 10/2001 | Iwanami et al. | |
| 2007/0175239 A1 | 8/2007 | Inoue | |
| 2015/0345349 A1 | 3/2015 | Monros | |
| 2015/0101981 A1 | 4/2015 | Lennox | |
| 2015/0240798 A1 | 8/2015 | Sato et al. | |
| 2016/0184898 A1 | 3/2016 | Rama et al. | |
| 2016/0072141 A1 | 6/2016 | Kohav | |
| 2017/0182561 A1* | 6/2017 | Scancarello | B22F 10/28 |
| 2017/0234143 A1* | 8/2017 | Snyder | F01D 5/147 165/51 |
| 2018/0272429 A1* | 9/2018 | Delmotte | B22F 7/06 |
| 2019/0153918 A1 | 5/2019 | Husband et al. | |

FOREIGN PATENT DOCUMENTS

| | | | |
|---|---|---|---|
| DE | 10221396 B4 * | 4/2007 | ........... B60H 1/3223 |
| DE | 10362162 | 4/2008 | |
| EP | 0742116 | 11/1996 | |
| FR | 2985769 | 7/2013 | |
| GB | 12444105 | 8/1971 | |
| JP | S61118591 | 6/1986 | |
| JP | H05195975 | 8/1993 | |
| WO | WO 2010/040355 | 4/2010 | |

OTHER PUBLICATIONS

PCT/US2018/60949 International Search Report and Written Opinion of the International Searching Authority dated Mar. 5, 2020 (10 pages).
Machine Design, "3D Printing's Fate According to a Technology Futurist," internet blog (May 12, 2014) retrieved from the internet Jan. 15, 2019, gttps:/www.machinedesign.com/blog/3d-printing-fate-according-technology-futurist> (pp. 1-6).
Machine Translation of European Patent EP 0742116 A2 to Obrist, published 1996 (Year: 1996).
Machine Translation of German Patent DE 10221396 A1 to Schwarzkopf, published 2003 (Year: 2003).

* cited by examiner

3D-PRINTED OIL SEPARATION FOR RECIPROCATING COMPRESSORS

FIELD OF THE DISCLOSURE

The present disclosure relates, generally, to the field of reciprocating compressors. More particularly, the present disclosure relates to a 3D-printed oil separation assembly and reciprocating compressors including the same.

BACKGROUND

Reciprocating compressors generally have a housing with a partition member, such as a wall, which divides the space within the housing into a suction chamber and a crankcase chamber, the lowest portion of which serves as an oil sump. The partition member is provided with relatively large openings in which cylinder sleeves are mounted and pistons are slidably mounted for reciprocating motion in the cylinder sleeves to compress gas passing through the suction chamber. The pistons are connected by connecting rods, which are provided with connecting rod bearings, to a crankshaft which is rotatably mounted on crankshaft bearings in the lower crankcase chamber. The partition member also supports capacity reduction mechanisms which are located in the upper suction chamber and which operate gas inlet valves which are located at the upper ends of the cylinder sleeves. The partition also includes one or more small pressure equalizers or vent holes which serve to provide for gas pressure equalization between the suction chamber and the crankcase chamber. The pressure equalizers or vent holes also serve to drain oil collected in the suction chamber to the crankcase chamber.

During compressor operation, lubricating oil is supplied under pressure through passages in the housing, crankshaft and piston rods to the connecting rod bearings and crankshaft bearings in the crankcase. As oil drains out of the bearings during crankshaft rotation, oil droplets are sprayed about the crankcase chamber and eventually drain into the oil sump from whence the oil is recovered and recirculated. Because of the "blow-by" phenomenon which occurs as the pistons compress the gas, some gas leaks past the pistons and rings and tends to pressurize the crankcase. As this gas is vented back to the suction chamber, it carries oil mist through the vent hole into the suction chamber where they mix with the gas being drawn into the cylinders compressed and expelled into the system. This is undesirable for at least two reasons. First, most of such oil is lost into the refrigeration system and is no longer available in the sump for lubrication purposes. Over time, the amount of oil lost is substantial and is costly to replace. Second, such oil contaminates both the refrigerant gas and the refrigeration system and reduces system efficiency.

As a practical matter, some of the oil mist coalesces in the suction chamber and collects on the partition member but is able to drain back into the crankcase chamber through the pressure equalizer hole and into the oil sump therein. However, oil dripping or draining through the pressure equalizer hole falls onto the rotating crankshaft and is sprayed about the crankcase chamber in the form of mist causing some mist to be expelled up through the pressure equalizer hole back into the suction chamber.

Installing an oil separation assembly can help minimize or mitigate the above-described concerns, but brings additional complexities. In order to achieve maximum benefit, an oil separation assembly should conform to the internal dimensions and configuration of the given compressor. Sometimes the amount of space available to build or install an oil separation assembly is limited by the small amount of space provided by the compressor. Moreover, more complex designs which may be more efficient at mitigating oil dripping/draining may be more difficult or expensive to manufacture and/or the compressors may be more difficult or expensive to retrofit with separation assemblies of such complex designs.

For at least these reasons, therefore, it would be advantageous if a new or improved oil separation assembly and/or method of forming a separation assembly could be developed that addressed one or more of the above-described concerns, and/or other concerns.

SUMMARY

The present disclosure provides an oil separation assembly for use in a reciprocating compressor. According to embodiments of the present disclosure, the compressor comprises a suction chamber, a crankcase chamber, and at least one partition member at least partially separating the suction chamber and the crankcase chamber, the at least one partition member including at least one opening, and the oil separation assembly comprises a coalescing structure positioned within the crankcase chamber with respect to the at least one partition member at the at least one opening and at least one securing structure secured in operable relation with the coalescing structure so as to secure the coalescing structure relative to the opening. According to embodiments of the present disclosure, at least a portion of the coalescing structure is 3D-printed. According to embodiments of the present disclosure, the coalescing structure is substantially or wholly 3D-printed. According to embodiments of the present disclosure, the coalescing structure comprises at least one structure selected from the group consisting of a baffled structure, a demisting structure, and combinations thereof.

In another embodiment, the present disclosure provides a reciprocating compressor. According to embodiments of the present disclosure, the reciprocating compressor comprises a suction chamber; a crankcase chamber; a partition member at least partially separating the suction chamber and the crankcase chamber and comprising at least one opening; and at least one oil separation assembly comprising a coalescing structure, wherein at least a portion of the coalescing structure is positioned within the crankcase chamber with respect to the partition member and adjacent the at least one opening. According to embodiments of the present disclosure, the coalescing structure is at least partially 3D-printed. According to embodiments of the present disclosure, the coalescing structure is substantially or wholly 3D-printed. According to embodiments of the present disclosure, the coalescing structure comprises at least one structure selected from the group consisting of a baffled structure, a demisting structure, and combinations thereof.

In another embodiment, the present disclosure provides a method of retrofitting a reciprocating compressor with an oil separation assembly, the compressor comprising a suction chamber, a crankcase chamber, and at least one partition member at least partially separating the suction chamber and the crankcase chamber, the at least one partition member including at least one opening, the method comprising identifying the internal dimensions of the compressor at the at least one opening; designing a coalescing structure configuration; programming a 3D printer based on the internal dimensions identified and coalescing structure configuration; 3D printing at least a portion of the coalescing structure; and securing the coalescing structure at the opening on the crankcase chamber-side of the partition member. According to embodiments of the present disclosure, the method includes 3D printing the entirety of the coalescing structure. According to embodiments of the present disclosure, the coalescing structure comprises at least one structure selected from the group consisting of a baffled structure, a demisting structure, and combinations thereof.

BRIEF DESCRIPTION OF THE DRAWINGS

Embodiments of the crankcase oil separation assembly and related methods are disclosed with reference to the accompanying drawings and are for illustrative purposes only. The crankcase oil separation assembly and related methods are not limited in application to the details of construction or the arrangement of the components illustrated in the drawings. The crankcase oil separation assembly and related methods are capable of other embodiments or of being practiced or carried out in other various ways. Like reference numerals are used to indicate like components. In the drawings.

DETAILED DESCRIPTION

Figure 1A:
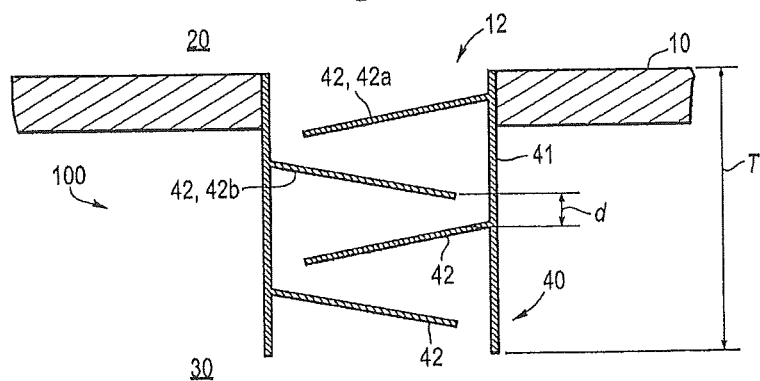
FIG. 1A is a cross-sectional schematic of an exemplary 3D-printed oil separation assembly in accordance with embodiments of the present disclosure.

The present disclosure provides a 3D-printed oil separation assembly 100 for use in a reciprocating compressor. As used herein, the term "3D-printed" refers to a structure, component or assembly at least a portion of which is 3D-printed, or a related process using a structure, component or assembly having at least a portion which has been 3D-printed. With reference to the Figures, reciprocating compressors generally include a partition member 10 which separates the suction chamber 20 and the crankcase chamber 30. The partition member 10 includes at least one opening 12 through which oil and refrigerant may flow. To reduce or hinder the flow of oil from the crankcase chamber 30 to the suction chamber 20 through the opening 12, an oil separation assembly 100 in accordance with the present disclosure is positioned relative to the opening 12 so as to create a serpentine or discontinuous flow path between the suction chamber 20 and the crankcase chamber 30. In an embodiment, a reciprocating compressor may be a high pressure reciprocating compressor.

As shown in the embodiments described herein, a 3D-printed oil separation assembly 100 comprises a coalescing structure which is a baffled structure, a demisting structure, or combination thereof, and at least one securing structure to hold the coalescing structure in position. At least a portion of either the coalescing structure, at least one securing structure, or both, is 3D-printed. In an embodiment, at least a portion of the coalescing structure of a 3D-printed oil separation assembly 100 is 3D-printed.

A "baffled structure," as used herein, is a structure having at least two or, preferably, a plurality of obstructions (e.g., baffles) which deflects or obstructs flow of gases or liquids. Nonlimiting examples of suitable baffled structures include a structure having serpentine channels, a structure containing a series of baffles, and like structures. A "demisting structure," as used herein, is a material, unit, assembly or combination thereof used to enhance the removal of liquid droplets of oil from the gaseous refrigerant stream. Nonlimiting examples of suitable demisting structures include materials such as mesh-type coalescers, including wire mesh-type coalescers (e.g., steel wool), mesh-type materials made of natural or synthetic fibers, other similar mesh-like materials, steel or stainless mesh. Coalescing structures (e.g., baffled structures and/or demisting structures) may be 3D-printed. In an embodiment, at least a portion of the coalescing structure is 3D-printed. In a further embodiment, the coalescing structure is substantially or wholly 3D-printed. In still a further embodiment, the coalescing structure is wholly 3D-printed.

Figure 1B:
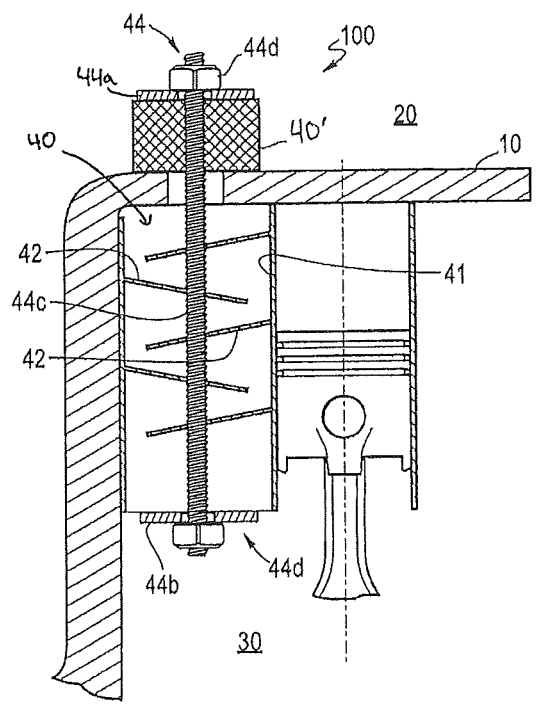
FIG. 1B is a further cross-sectional schematic of the exemplary 3D-printed oil separation assembly in accordance with embodiments of the present disclosure.

In the embodiment shown in FIGS. 1A-1B, the 3D-printed oil separation assembly 100 comprises a coalescing structure which is a baffled structure 40 and, in the embodiment shown in FIG. 1B, optionally, a demisting structure 40'. In the embodiments shown in FIG. 2, the 3D-printed oil separation assembly 100 comprises a coalescing structure which is one more demisting structures 40'. In other embodiments, the 3D-printed oil separation assembly 100 may have a coalescing structure comprising both a baffled structure 40 and a demisting structure 40', or further still, in some embodiments, a baffled structure 40 may be formed of, or may itself form, a demisting structure 40'. Similarly, the number of coalescing structures, and particular arrangement of coalescing structures, can vary depending on the particular configuration and/or operating parameters of the reciprocating compressor and the desired oil separating result.

Turning now to the Figures, a 3D-printed oil separation assembly 100 generally includes at least one coalescing structure positioned adjacent to the opening 12 on one or both sides of the opening 12 and at least one securing structure 44 which secures the at least one coalescing structure in position.

With particular reference to FIG. 1A, shown is an exemplary 3D-printed oil separation assembly 100 in accordance with embodiments of the present disclosure. In the embodiment shown, the 3D-printed oil separation assembly 100 includes a single coalescing structure which comprises a baffled structure 40. The baffled structure 40 is positioned on the crankcase side of the opening 12. Specifically, in the embodiment shown, the coalescing structure is a single baffled structure 40 comprising a shell or outer wall 41 and at least two, or, in the embodiment shown, a plurality of baffles 42 in an alternating sloping arrangement. That is, a first baffle 42a has a first slope and a first free end and a first secured end and a second baffle 42b having a second free end and a second secured end, such that the first and second free ends and first and second secured ends are oppositely disposed, and the first free end is closer to the second secured end than the first secured end to the second free end.

In the embodiment shown, the baffles 42 are connected to the outer wall 41 at an angle from 5°, or 10°, or 15° to 20°, or 25°, or 30° in order to provide the sloping orientation. As shown perhaps more clearly in FIG. 1B, the baffles 42 are sloped such that any flow from the crankcase chamber 30 to the suction chamber 20 will be uphill. While this configuration serves to create additional resistance for flow from the crankcase chamber 30 to the suction chamber 20 (relative to baffles being sloped in the opposite direction, that is, such that flow from the crankcase chamber 30 to the suction chamber 20 is "downhill"), it will be understood that different configurations and arrangements of baffles can be used, such as, for example, contoured baffles, straight baffles, "downhill" baffles, and combinations thereof.

In an embodiment, the distance between the free end of a given baffle and the outer wall 41 is at least 1.5× the diameter of the opening 12.

In an embodiment, the distance between the free end of a baffle 42 and the secured end of a subsequent baffle 42 (d) is greater than or equal to a cross-sectional area of the opening 12 at a given location, e.g., at the partition 10 or at a location near the baffles at issue. In some embodiments, the distance d is from greater than or equal to a cross-sectional area of the opening 12, or 1.5× a cross-sectional area of the opening 12, or 2× a cross-sectional area of the opening 12, or 2.5× a cross-sectional area of the opening 12 to 3× a cross-sectional area of the opening 12, or 3.5× a cross-sectional area of the opening 12, or 4× a cross-sectional area of the opening 12, or 4.5× a cross-sectional area of the opening 12, or 5× a cross-sectional area of the opening 12.

In the embodiment shown, the coalescing structure, or in the present embodiment, baffled structure 40, has a total thickness (T). In an embodiment, the coalescing structure has a T from 0.5 in, or 1 in to 1.5 in, or 2 in. In further embodiments, the total thickness T may be specifically selected or designed based on the size of the opening 12 and/or the capacity, performance or other metric of the compressor, the design or material of the at least one coalescing structure, the efficiency, performance, or other metric of the oil separation assembly 100, and/or combinations thereof.

As shown in FIG. 1A, the coalescing structure, and, more particularly, the baffled structure 40 is positioned such that at least a portion of the coalescing structure is contained within the opening 12. That is, in the embodiment shown in FIG. 1A, a portion of the coalescing structure, and particularly the shell or outer wall 41 of the baffled structure 40 is in contact with the walls of the opening 12. However, in further embodiments, such as shown in FIG. 1B, the coalescing structure, and, particularly, the baffled structure 40, may be completely contained within the crankcase chamber 30 or, in other embodiments, within the suction chamber 20.

As shown in FIG. 1B, a demisting structure 40' may optionally be used in combination with a baffled structure 40 to form a coalescing structure. In the embodiment shown in FIG. 1B, the demisting structure 40' is shown as positioned on the suction chamber-side of the opening 12, with the baffled structure 40 positioned on the crankcase chamber-side of the opening 12. In further embodiments, a demisting structure 40' may be provided on the crankcase chamber-side of the opening 12 or both sides of the opening 12. In still further embodiments, a baffled structure 40 may be at least partially filled with a demisting structure 40' and/or itself at least partially made using a demisting structure 40'.

In the embodiments shown in FIGS. 1A-1B, the baffled structure 40 is at least partially 3D-printed, or preferably substantially 3D-printed. In a further embodiment, the baffled structure 40 is wholly 3D-printed. In further embodiments, and with respect to FIG. 1B, at least a portion of the demisting structure 40' may be 3D-printed. In an embodiment, at least a portion of the demisting structure 40' may be 3D-printed in addition to at least a portion of the baffled structure 40 being 3D-printed. In a further embodiment, at least a portion of the baffled structure 40 is 3D-printed and the demisting structure 40' is a mesh-type coalescer, such as steel wool.

The 3D-printed oil separation assembly 100 further includes at least one securing structure 44 which secures the coalescing structure in position relative to the opening 12. In the particular embodiment shown in FIG. 1B, the at least one securing structure 44 secures both the baffled structure 40 and demisting structure 40' in position relative to the opening 12, with the demisting structure 40' secured on the suction chamber-side of the opening 12 and the baffled structure 40 secured on the crankcase chamber-side of the opening 12.

The at least one securing structure 44 may be a single component or an assembly which is secured in operable relation with the coalescing structure so as to secure the coalescing structure relative to the opening 12. As shown in FIG. 1B, the at least one securing structure 44 is a securing assembly comprising a first support 44a, a second support 44b and a locking structure 44c. More particularly, in the embodiment shown, the at least one securing structure 44 includes a first support 44a which is a plate, a second support 44b which is also a plate, and a locking structure 44c which is a locking stud. As illustrated specifically in FIG. 1B, the first support 44a is on the suction chamber-side of the opening 12 and adjacent with the partition member 10. While in the embodiment shown, the first support 44a is in contact with the demisting structure 40', in other embodiments, particularly if no portion of a coalescing structure is on the suction chamber-side of the opening 12, the first support 44a may contact the partition 10 directly. In further embodiments, one or more structures may be positioned between the first support 44a and the coalescing structure or partition member 10 so that the first support 44a is in indirect contact with the coalescing structure or partition member 10. For example, one or more structures which provide additional strength to the partition 10 or one or more structures which cushion or protect the partition 10 may be provided.

Similarly, the second support 44b is on the crankcase chamber-side of the baffled structure 40 and adjacent the outer surface of the baffled structure 40 so as to sandwich the baffled structure 40 between the partition member 10 and the second support 44b. Again, while in the embodiment shown the second support 44b is shown to be in direct contact with the baffled structure 40, in further embodiments, one or more additional structures (e.g., strengthening structure, protective structure, cushioning structure) may be provided between the baffled structure 40 and the second support 44b so that the second support 44b is in indirect contact with the baffled structure 40. Likewise, in embodiments in which no portion of a coalescing structure is on the crankcase chamber-side of the opening 12, the second support 44b may directly or indirectly contact the partition 10.

In being positioned adjacent the baffled structure 40' on the crankcase side, the second support 44b also serves as a first barrier to prevent or limit large oil droplets from passing into the coalescing structure and therefore through the opening 12.

The locking stud 44c passes through the first support 44a, the demisting structure 40', the opening 12, the baffled structure 40 and the second support 44b and, along with washers and lock nuts 44d, for example, tightens the first and second supports 44a, 44b toward one another. The portions of the coalescing structure, i.e., the demisting structure 40' on the suction chamber-side and the baffled structure 40 on the crankcase chamber-side, are thereby compressed against the partition member 10 and secured in position relative to the opening 12.

While in the embodiment shown, and otherwise generally throughout the description of the drawings, the first support 44a is discussed and described with respect to the suction chamber-side of the oil separation assembly and the second support 44*b* is discussed and described with respect to the crankcase chamber-side of the oil separation assembly, it will be understood that the first and second supports 44*a*, 44*b* may be used interchangeably as permitted.

Figure 2:
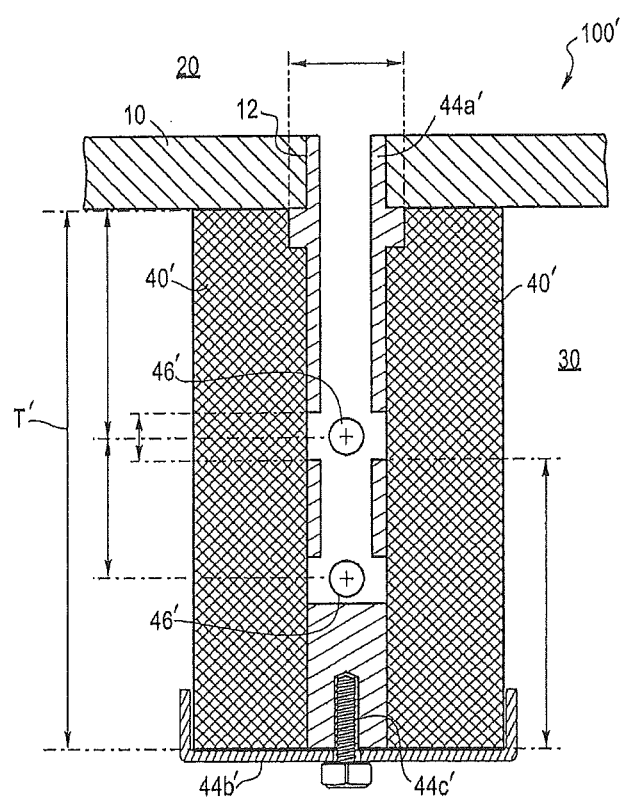
FIG. 2 is a cross-sectional view of an exemplary 3D-printed oil separation assembly in accordance with embodiments of the present disclosure.

FIG. 2 shows a second embodiment of a 3D-printed oil separation assembly 100' for use in a reciprocating compressor in accordance with embodiments of the present disclosure. In the embodiment shown, the 3D-printed oil separation assembly 100' includes a coalescing structure positioned entirely within the crankcase chamber 30 with a securing structure 44 at least partially contained within the opening 12. That is, in the embodiment shown in FIG. 2, the securing structure 44 has a portion which is in contact with the walls of the opening 12.

As with FIGS. 1A-1B, the coalescing structure is composed of at least one of a baffled structure or demisting structure. In an embodiment, the coalescing structure is shown as a single demisting structure 40'; however, in further embodiments, it will be appreciated that the coalescing structure may be a single baffled structure. In embodiments in which the coalescing structure is a demisting structure 40', at least a portion of the demisting structure 40' is 3D-printed. In further embodiments, particularly those in which the coalescing structure is a demisting structure 40', the demisting structure 40' is wholly 3D-printed.

The coalescing structure, or, in the embodiment shown in FIG. 2, the demising structure 40', has a total thickness (T'). In an embodiment, the demisting structure 40' has a T' from 1 in, or 1.5 in, or 2 in to 2.5 in, or 3 in, or 3.5 in, or 4 in. In further embodiments, the total thickness T may be specifically selected or designed based on the size of the opening 12 and/or the capacity, performance or other metric of the compressor.

The 3D-printed oil separation assembly 100' further includes at least one securing structure 44' composed of first support 44*a*', second support 44*b*' and locking structure which secures the coalescing structure, or, in the embodiment shown in FIG. 2, the demisting structure 40', to the crankcase chamber side of the opening 12 and adjacent the opening 12. More particularly, in the embodiment shown, the first support 44*a*' is a channel-forming support which extends from the opening 12 into the crankcase chamber 30. The first support 44*a*' is a tube-like structure which creates a channel into the crankcase chamber 30 around which the coalescing structure, e.g., demisting structure 40', may be positioned. The first support 44*a*' also serves as a structure with which the locking structure 44*c*' can engage. To facilitate adequate flow through the suction chamber 20 and crankcase chamber 30, and facilitate pressure equalization between the chambers 20, 30, the embodiment shown in FIG. 2 the first support 44*a*' also includes cross holes 46' to allow gasses to pass through the opening 12 and demisting structure 42. In the embodiment shown in FIG. 2, the second support 44*b*' is a structure which provides a first barrier for larger oil droplets from passing through the opening 12, such as, for example, a plate or a cup. The locking structure 44*c*' is a structure which engages the first and second supports 44*a*', 44*b*' to secure the demisting structure 40' in position relative to the opening 12. In an embodiment shown, the locking structure 44*c*' is a screw.

In an embodiment, one advantage of the 3D-printed oil separation assembly described herein is that the assembly or components thereof, i.e., the coalescing structure, or one or more components thereof, may be at least partially, or preferably substantially or wholly, manufactured by 3D printing. By utilizing 3D printing technology, coalescing structures, and, in particular, baffled structure or demisting structures, can be custom made to fit a particular opening. In a particular embodiment, a coalescing structure is as shown in FIGS. 1A-1B comprising at least one baffled structure. Such a baffled structure can be formed to have exact external dimensions which fit the specific compressor cavity, and such forming is more readily completed using 3D printing. Moreover, the discontinuous channels of a demisting structure can be more complex and precise when the demisting structure is made using 3D printing.

In an embodiment, one advantage of the 3D-printed oil separation assembly described herein is that the assembly may be installed into existing reciprocating compressors. That is, existing reciprocating compressors may be retrofit with the 3D-printed oil separation assembly of the present disclosure. Existing reciprocating compressors may therefore exhibit the improvements in operation provided by the oil separation assembly.

To install the 3D-printed oil separation assembly in a reciprocating compressor, whether a new compressor or an existing compressor, a coalescing structure is provided at an opening of the partition member of the compressor. At least one securing structure is then assembled in operable relation to the coalescing structure to secure the coalescing structure in place relative to the opening.

The coalescing structure may be any embodiment or combination of embodiments described herein. In an embodiment, the coalescing structure comprises at least one baffled structure. In a further embodiment, the coalescing structure comprises at least one demisting structure. In a still further embodiment, the coalescing structure comprises a baffled structure and a demisting structure.

In an embodiment, the at least one of a baffled structure or demisting structure is provided at an opening at the partition member of the compressor on the crankcase chamber-side of the opening. If the coalescing structure includes a second component (i.e., a further baffled structure or demisting structure), in an embodiment, the second component is provided at the opening of the suction chamber-side of the opening. The at least one securing structure is then assembled in operable relation to the first (and, if utilized, second) components of the coalescing structure to secure the baffled structure(s) and/or demisting structure(s) in place.

In an embodiment, the method of installing the 3D-printed oil separation assembly in a reciprocating compressor further includes 3D-printing at least a portion of the at least one of a baffled structure, demisting structure, or combinations thereof. In an embodiment, the coalescing structure (or, at least one of the baffled structure, demisting structure, or combinations thereof) is substantially or wholly 3D-printed. In embodiments, the step of 3D-printing includes at least one of identifying and/or calculating internal dimensions of a reciprocating compressor at the location the oil separation assembly will be installed, designing or identifying a pattern to be printed (e.g., a series of baffles), selecting a suitable material for 3D printing, programming a 3D printer to perform the printing, and printing the at least one baffled structure, demisting structure, or combinations thereof.

In an embodiment, the at least one securing structure includes a first support, a second support and a locking structure. In such embodiment, the step of assembling the at least one securing structure in operable relation to the coalescing structure includes positioning a first support in relation to the coalescing structure, positioning a second support in relation to the coalescing structure, and securing the first and second supports in position using a locking structure.

In an embodiment, only a crankcase chamber-side coalescing structure (i.e., baffled structure or demisting structure) is provided. In such an embodiment, the step of assembling the at least one securing structure in operable relation to the coalescing structure may include, for example, positioning a first support in relation to the opening at the partition member to extend into the crankcase chamber and into the coalescing structure, positioning a second support in relation to the coalescing structure in the crankcase chamber, and securing the first and second supports together in relation to the demisting structure using a locking structure.

In an embodiment in which the coalescing structure is composed of two or more structures (i.e., two or more of a baffled structure, a demisting structure, and combinations thereof) that are used on opposite sides of an opening (i.e., a suction chamber-side structure and a crankcase chamber-side structure are both used), the step of assembling the at least one securing structure in operable relation to the coalescing structure may include, for example, positioning a first support in relation to the suction chamber-side component of the coalescing structure, positioning a second support in relation to the crankcase chamber-side component of the coalescing structure, and securing the first and second supports together in relation to the coalescing structure using a locking structure.

The 3D-printed oil separation assembly described herein addresses at least three issues. First, the oil separation assembly limits the amount of oil passing through the vent holes 12 from the crankcase chamber to the suction chamber when the rotating crankshaft splashes or sprays oil that comes in contact with it.

Second, the 3D-printed oil separation assembly helps to maintain a pressure equilibrium between the suction chamber and the crankcase chamber.

Third, the 3D-printed oil separation assembly assists in returning oil collected in the suction chamber back to the crankcase chamber.

By (1) limiting the amount of oil passing from the crankcase chamber to the suction chamber, the oil separation assembly decreases oil loss and therefore costs associated with operating and maintaining a reciprocating compressor, (2) helping to maintain a pressure equilibrium between the suction chamber and crankcase chamber, and (3) assisting in returning oil collected in the suction chamber back to the crankcase chamber.

The disclosed 3D-printed oil separation assembly is also easily installed in existing reciprocating compressors at existing vent holes.

Additional advantages of the 3D-printed oil separation assembly will be readily identified and understood by those of skill in the art.

One of skill in the art will understand that the specific measurements (e.g., height, width, diameter, etc.) of the oil separation assembly may vary based on compressor design and the dimensions of the 3D-printed oil separation assembly may be altered accordingly to correspond to the measurements of the compressor.

The 3D-printed oil separation assemblies contemplated and disclosed within above are now exemplified in the following embodiments:

E1. An oil separation assembly for use in a reciprocating compressor, the compressor comprising a suction chamber, a crankcase chamber, and at least one partition member at least partially separating the suction chamber and the crankcase chamber, the at least one partition member including at least one opening, the oil separation assembly comprising: a coalescing structure having at least a portion of which is positioned within the crankcase chamber adjacent the at least one partition member at the at least one opening; and at least one securing structure secured in operable relation with the at least one coalescing structure so as to secure the at least one coalescing structure relative to the opening.

E2. The oil separation assembly of E1, wherein the coalescing structure comprises at least one structure selected from the group consisting of a baffled structure, a demisting structure, and combinations thereof. E3. The oil separation assembly of E2, wherein the coalescing structure comprises a baffled structure. E4. The oil separation assembly of E2, wherein the coalescing structure comprises a demisting structure. E5. The oil separation assembly of E2, wherein the coalescing structure comprises a baffled structure and a demisting structure. E6. The oil separation assembly of E5, wherein the baffled structure is positioned with in the crankcase chamber adjacent the at least one partition member at the at least one opening and the demisting structure is positioned within the suction chamber adjacent the at least one partition member at the at least one opening.

E7. The oil separation assembly of E2, wherein the coalescing structure comprises a first demisting structure. E8. The oil separation assembly of E7, wherein the coalescing structure comprises a second demisting structure. E9. The oil separation assembly of E7-E8, wherein one of the first and second demisting structures is selected from the group consisting of wire mesh, steel wool, stainless mesh, steel mesh and combinations thereof.

E10. The oil separation assembly of E1-E9, wherein the at least one securing structure comprises a first support, a second support and a locking structure.

E11. The oil separation assembly of E1-E10, wherein at least a portion of the coalescing structure is 3D-printed. E12. The oil separation assembly of E1-E11, wherein the coalescing structure is substantially or wholly 3D-printed.

E13. An oil separation assembly for use in a reciprocating compressor, the compressor comprising a suction chamber, a crankcase chamber, and at least one partition member at least partially separating the suction chamber and the crankcase chamber, the at least one partition member including at least one opening, the oil separation assembly comprising: a coalescing structure, wherein at least a portion of the coalescing structure is positioned within the crankcase chamber adjacent the at least one partition member at the at least one opening; and at least one securing structure secured in operable relation with the coalescing structure so as to secure the at least one coalescing structure relative to the opening, wherein at least a portion of the coalescing structure is 3D printed.

E14. The oil separation assembly of E13, wherein the coalescing structure comprises at least one structure selected from the group consisting of a baffled structure, a demisting structure, and combinations thereof.

E15. The oil separation assembly of E14, wherein the coalescing structure comprises at least one baffled structure.

E16. The oil separation assembly of E15, wherein the at least one baffled structure comprises an outer wall and a plurality of sloped baffles.

E17. The oil separation assembly of E16, wherein the plurality of sloped baffles comprises at least a first sloped baffle having a free end and a secured end and a subsequent sloped baffle having a free end and a secured end, wherein the secured ends are secured to the outer wall such that the free ends are oppositely disposed and the free end of the first baffle is closer to the secured end of the subsequent baffle than the secured end of the first baffle to the free end of the subsequent baffle.

E18. The oil separation assembly of E17, wherein the first and subsequent sloped baffles are each secured to the outer wall at an angle from 5° to 30°.

E19. The oil separation assembly of any of E17-18, wherein the distance between the free end of the first baffle and the secured end of the subsequent baffle is greater than or equal to a cross-sectional area of the opening.

E20. The oil separation assembly of any of E15-19, wherein the at least one baffled structure is 3D printed.

E21. The oil separation assembly of any of E15-E20, wherein the at least one baffled structure is wholly 3D printed.

E22. The oil separation assembly of any of E15-12, wherein the coalescing structure further includes at least one demisting structure.

E23. The oil separation assembly of E14, wherein the coalescing structure comprises at least one demisting structure.

E24. The oil separation assembly of E23, wherein the coalescing structure further includes a second demisting structure positioned within the suction chamber adjacent the at least one partition member at the at least one opening.

E25. The oil separation assembly of any of E13-E24, wherein the at least one securing structure comprises a first support, a second support, and a locking structure.

E26. A reciprocating compressor comprising: a suction chamber; a crankcase chamber; a partition member at least partially separating the suction chamber and the crankcase chamber and comprising at least one opening; and at least one oil separation assembly comprising a coalescing structure, wherein at least a portion of the coalescing structure is positioned within the crankcase chamber adjacent the at least one partition member at the at least one opening; and at least one securing structure secured in operable relation with the coalescing structure so as to secure the at least one coalescing structure relative to the opening, wherein at least a portion of the coalescing structure is 3D printed.

E27. The reciprocating compressor of E26, wherein the coalescing structure is substantially or wholly 3D-printed.

E28. The reciprocating compressor of any of E26-27, wherein the coalescing structure comprises at least one structure selected from the group consisting of a baffled structure, a demisting structure, and combinations thereof.

E29. The reciprocating compressor of any of E26-28, wherein the coalescing structure comprises at least one baffled structure.

E30. The reciprocating compressor of E29, wherein the at least one baffled structure comprises an outer wall and a plurality of sloped baffles.

E31. The reciprocating compressor of E30, wherein the plurality of sloped baffles comprises at least a first sloped baffle having a free end and a secured end and a subsequent sloped baffle having a free end and a secured end, wherein the secured ends are secured to the outer wall such that the free ends are oppositely disposed and the free end of the first baffle is closer to the secured end of the subsequent baffle than the secured end of the first baffle to the free end of the subsequent baffle.

E32. A method of retrofitting a reciprocating compressor with an oil separation assembly, the compressor comprising a suction chamber, a crankcase chamber, and at least one partition member at least partially separating the suction chamber and the crankcase chamber, the at least one partition member including at least one opening, the method comprising: identifying the internal dimensions of the compressor at the at least one opening; designing a coalescing structure configuration; programming a 3D printer based on the internal dimensions identified and coalescing structure configuration; 3D printing at least a portion of the coalescing structure; and securing the coalescing structure at the opening on the crankcase chamber-side of the partition member.

E33. The method of E32, where 3D printing at least a portion of the coalescing structure includes 3D printing the entirety of the coalescing structure.

The terms "comprising," "including," "having," and their derivatives, are not intended to exclude the presence of any additional component, step or procedure, whether or not the same is specifically disclosed.

Unless stated to the contrary, implicit from the context, or customary in the art, all parts and percentages are based on weight and all test methods are current as of the filing date of this disclosure.

It is specifically intended that the crankcase 3D-printed oil separation assembly and related methods not be limited to the embodiments and illustrations contained herein, but include modified forms of those embodiments including portion so the embodiments and combinations of elements of different embodiments as come with the scope of the following claims. In addition, the order of various steps of operation described herein can be varied. Further, numerical ranges provided herein are understood to be exemplary and shall include all possible numerical ranges situated there between.

What is claimed is:

1. A method of making a coalescing structure for use in a reciprocating compressor, the method comprising:
   designing a coalescing structure configuration;
   programming a 3D printer based on the coalescing structure configuration; and
   3D printing at least a portion of the coalescing structure;
   wherein the coalescing structure comprises a baffled structure, and 3D printing at least a portion of the coalescing structure comprises 3D printing at least a portion of the baffled structure.

2. The method of claim 1, wherein the step of 3D printing at least a portion of the coalescing structure comprises 3D printing the entirety of the coalescing structure.

3. The method of claim 1, wherein 3D printing at least a portion of the coalescing structure comprises 3D printing the entirety of the baffled structure.

4. The method of claim 1, wherein the at least one baffled structure comprises an outer wall and a plurality of sloped baffles.

5. The method of claim 1, wherein the coalescing structure further comprises a demisting structure, and 3D printing at least a portion of the coalescing structure comprises printing at least a portion of the demisting structure.

6. The method of claim 5, wherein 3D printing at least a portion of the coalescing structure comprises 3D printing the entirety of the demisting structure.

7. A method of making a coalescing structure for use in a reciprocating compressor, the method comprising:
   designing a coalescing structure configuration;
   programming a 3D printer based on the coalescing structure configuration; and
   3D printing at least a portion of the coalescing structure;
   wherein the coalescing structure comprises a baffled structure and a demisting structure, and 3D printing at least a portion of the coalescing structure comprises 3D printing at least a portion of the baffled structure and at least a portion of the demisting structure.

8. The method of claim 7, wherein 3D printing at least a portion of the coalescing structure comprises 3D printing the entirety of the baffled structure and the demisting structure.

\* \* \* \* \*